(12) United States Patent
Martini et al.

(10) Patent No.: US 7,998,356 B2
(45) Date of Patent: Aug. 16, 2011

(54) OPTICAL INTEGRATED DEVICE MANUFACTURING PROCESS

(75) Inventors: Francesco Martini, Alzate Brianza (IT); Daniela Barge, San Martino Siccomario (IT); Ubaldo Mastromatteo, Bareggio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 830 days.

(21) Appl. No.: 12/015,338

(22) Filed: Jan. 16, 2008

(65) Prior Publication Data

US 2009/0308839 A1 Dec. 17, 2009

(30) Foreign Application Priority Data

Jan. 18, 2007 (IT) ............................... MI2007A0062

(51) Int. Cl.
*B29D 11/00* (2006.01)

(52) U.S. Cl. .................. 216/24; 216/2; 216/11; 216/41; 438/57

(58) Field of Classification Search .................... 216/24, 216/2, 11, 41; 438/57; 385/37, 129, 130, 385/14, 16

See application file for complete search history.

(56) References Cited

U.S. PATENT DOCUMENTS 5,894,538 A 4/1999 Presby

OTHER PUBLICATIONS

Henry, et al. "Glass Waveguides on Silicon for Hybrid Optical Packaging"; Journal of Lightwave Technology; IEEE; Oct. 1989; pp. 1530-1539; vol. 7, No. 10; US.

*Primary Examiner* — Nadine G Norton
*Assistant Examiner* — Mahmoud Dahimene
(74) *Attorney, Agent, or Firm* — William J. Kubida; Peter J. Meza; Hogan Lovells US LLP

(57) ABSTRACT

The invention relates to a process for manufacturing an integrated optical device. The method involves forming a silicon dioxide multilayer structure on a silicon substrate containing, in a first region a core layer of a waveguide of the optical device. The core includes an electromagnetic radiation inlet/outlet A trench in a second region of the multilayer structure adjacent said first region is formed by a an anisotropic etching, the trench including side walls and a bottom wall spaced from the Substrate. The method further involves forming a coating layer of the side walls and the bottom wall of the trench; defining an opening in the bottom wall by at least partially removing the coating layer in order to expose the lower silicon dioxide of the multilayer structure; performing an isotropic etch through said opening in order to remove, starting from the exposed silicon dioxide, the multilayer structure silicon dioxide until forming a recess in the multilayer structure having a first wall at least one essentially planar portion inclined relative to the substrate. Such inclined portion extends at least partially in the first region, and includes the inlet/outlet port.

21 Claims, 5 Drawing Sheets

OPTICAL INTEGRATED DEVICE MANUFACTURING PROCESS

RELATED APPLICATION

The present application claims priority of Italian Patent Application No. MI2007A000062 filed Jan. 18, 2007, entitled PROCESSO DI FABBRICAZIONE DI UN DISPOSITIVO OTTICO INTEGRATO.

FIELD OF THE INVENTION

The present invention relates to the integrated devices and, more particularly, to a process for manufacturing optical devices comprising integrated waveguides.

BACKGROUND OF THE INVENTION

As is known, optical systems capable of transmitting high amounts of information at a considerable distance with reduced distortion are increasingly employed in the field of communication systems.

Such optical systems employ both optical devices adapted to transmit and/or receive information in the form of light signals, and optical devices such as to allow the propagation of such light signals.

For example, the transmitting/receiving devices include photodetectors, optical signal transmitters, and modulators. On the other hand, the light signal propagation devices comprise, for example, integrated waveguides that are typically called the optical circuits by those skilled in the art.

A method for manufacturing optical devices comprising integrated waveguides on a silicon substrate is described in the document "Glass Waveguides on Silicon for Hybrid Optical Packaging", by C. H. Henry et al., 7 J. Lightwave Technol., pages 1530-1539, which is included by reference herein below. In particular, the waveguide described in such document comprises a glassy core layer having a respective refractive index. Such core layer is surrounded by glassy coating layers having a refractive index lower than the core layer index. Consequently, a light radiation propagating in the guide remains confined in the core layer.

Furthermore, hybrid optical devices are known, that is, comprising a transmitting and/or receiving optical device associated to the waveguide device. In particular, the latter waveguide device comprises a deviation wall, or turning mirror, which is inclined by a prefixed angle (for example, 45°) relative to a propagation direction of the light radiation in the guide. Such mirror is adapted to deviate such light radiation towards an active portion of the receiving device.

It should be noted that the turning mirrors are manufactured in some waveguide devices by employing metallization layers that are deposited on inclined surfaces opposite the same waveguide, and spaced by trenches from the latter.

In particular, in such devices the light signal must cover a path in the air outside the guide in order to reach the mirror and be reflected towards the receiving device. Consequently, such signal undergoes undesired attenuations and dispersions following the refractive index differential between the waveguide and the air.

U.S. Pat. No. 5,894,538 discloses a method for manufacturing waveguide devices comprising turning mirrors inside the same guide. In particular, such mirrors are obtained by means of a vaporization of portions of the guide coating layers with high-energy light beams. In greater detail, such light beams are incident on the guide coating layers along directions which are inclined relative to the radiation propagation direction, in order to remove portions of such layers in the proximity of a core inlet/outlet end.

It should be noted that in the thus-obtained waveguide devices, the light radiation propagation and reflection take place essentially within the guide coating layers, thereby the light signal attenuations are reduced.

However, in order to manufacture the above-mentioned inner mirrors with an accurate and controllable inclination by conventional techniques, it is necessary to employ advanced and expensive equipments, while performing complex productive process steps.

SUMMARY OF THE INVENTION

In a particularly preferred embodiment, the invention relates to a process for manufacturing an integrated optical device, in particular an integrated waveguide, as defined by the annexed claim 1. Preferred embodiments of the process are defined by the dependant claims 2 to 19.

BRIEF DESCRIPTION OF THE DRAWINGS

The characteristics and advantages of the present invention will be understood from the following detailed description of an exemplary and non-limiting embodiment thereof, with relation to the annexed drawings, in which.

DETAILED DESCRIPTION OF PREFERRED EMBODIMENTS

With reference to the FIGS. 1-10, a process for manufacturing an integrated optical device 100 in accordance with an embodiment of the present invention can be described.

In particular, the above-mentioned device 100 is of the type comprising an integrated waveguide for the propagation of electromagnetic radiation. Such waveguide device 100 is also referred to by the term "optical circuit" by those skilled in the art.

It should be noted that the electromagnetic radiation propagating in the guide will be called the "light radiation" herein below for sake of simplicity. However, any type of electromagnetic radiation will be meant to be included by the term "light radiation", not only in the visible light field, but also in the field of the optical frequencies such as, for example, infrared, ultraviolet, or non-optical frequencies, such as the microwaves.

The process according to the invention initially provides the formation of a silicon dioxide multilayer structure on a support silicon substrate 1. In more detail, and with reference to the FIG. 1, a first silicon dioxide layer 2 is created on the silicon substrate 1, usually by deposition.

Figure 1:
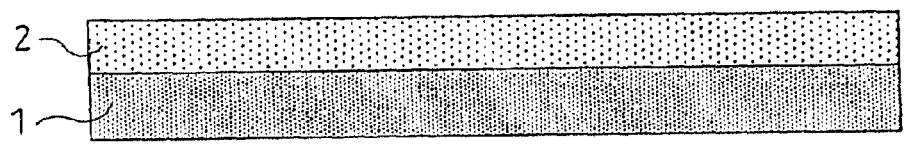
FIGS. 1-3 show, in sectional views, initial steps of the process for manufacturing the integrated waveguide optical device of the present invention.
Figure 2:
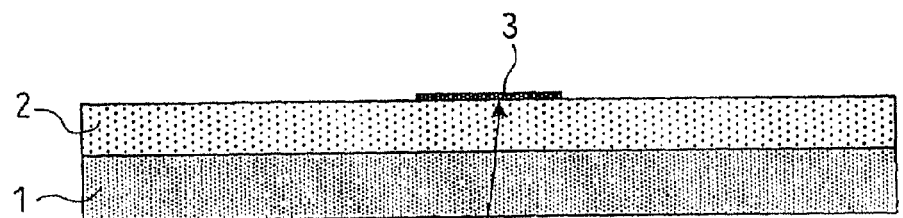

Subsequently, as shown in FIG. 2, one proceeds, through a conventional photolithographic process, to the delimitation of a protective layer or protective element 3 on said first silicon dioxide layer 2. Such protective element 3 is adapted to cover a lower portion 4 of the first silicon dioxide layer 2 in order to protect it, as it will be described herein below, by successive etching steps which are provided for by the process.

Such protective element 3 is preferably polycrystalline silicon, the deposition of which occurs by means of a low pressure chemical vapour deposition technique, or LPCVD, and has a thickness in the range between 0.5-3 μm.

At this stage, the process of the invention provides a further conventional deposition step of further silicon dioxide so as to form the lower coating or cladding layer of an integrated optical waveguide with the first silicon dioxide layer 2.

Figure 3:
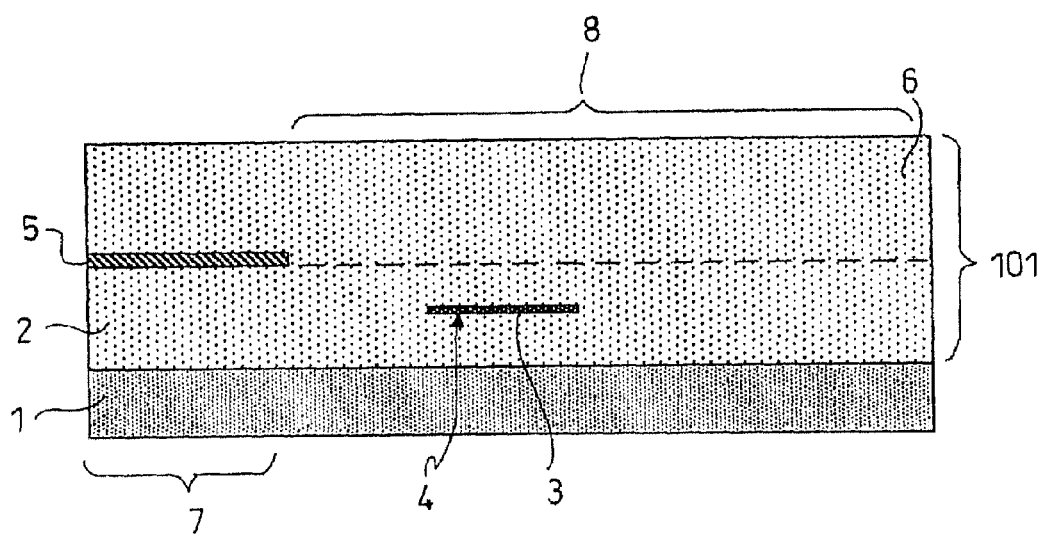

It should be noted that the overall lower cladding layer, again for sake of simplicity indicated with the reference numeral 2 in FIG. 3, is preferably silicon dioxide which is doped with impurities of a type and concentration such as to reach a prefixed refractive index $n_{cladding}$. In some cases, the lower cladding layer 2 can also be non-doped silicon dioxide.

As it should be noted with reference to the FIG. 3, at the end of this deposition step the protective element 3 turns out to be buried inside the lower cladding layer 2, thereby being spaced from the substrate 1.

Then, a core layer 5 (core) is deposited on the lower cladding layer 2, which is doped with a type and a concentration of impurities which are different from those of the lower cladding layer 2, so that the core refractive index $n_{core}$ is higher than the lower cladding refractive index ($n_{core} > n_{cladding}$). It should be noted that for some applications it is sufficient to have, for example, $n_{core}$ higher than 0.3% $n_{cladding}$. The core layer 5 can be preferably doped with germanium or other materials such as, for example, phosphorous, nitrogen, nitrogen oxide, and alumina.

Furthermore, such core layer 5 is subjected to a known photolithographic process, following which the layout of one or more cores 5 of the waveguide of the integrated optical device 100 which is designed is obtained.

Again, with reference to the FIG. 3, the silicon dioxide structure is completed by the deposition of an upper coating or cladding layer 6. This upper cladding layer will superiorly and laterally coat the core 5.

Such upper cladding layer 6 is preferably in silicon dioxide doped with a concentration of impurities (for example, boron and phosphorous) so as to have the same refractive index $n_{cladding}$ of the lower cladding layer 2. Under the condition $n_{core} > n_{cladding}$, the optical radiation propagates essentially inside the optical paths defined by the core 5.

It should be noted that a dotted contact line between the lower 2 and the upper 6 cladding layers is shown in FIG. 3. Taking into account that both such layers have characteristics which are essentially identical (same refractive index $n_{cladding}$) said line will be not reported anymore in the successive Figures.

Furthermore, it should be noted that, in the case that the core refractive index $n_{core}$ is more than 1% of that of the cladding layers $n_{cladding}$, the layers formed by delimiting the integrated optical waveguide have thicknesses, for example, in the following range: the lower cladding layer 2 has a thickness of 13-17 μm; the core 5 has a thickness of 3-4 μm; the upper cladding layer 6 has a thickness of 13-17 μm.

Typical values for the refractive indexes of core 5 and lower 2 and upper 6 cladding layers are, for example: $n_{core}$=1.4650, $n_{cladding}$=1.4500.

According to the example which is taken into account, the described process leads to the manufacturing of an optical device 100 which is adapted to the propagation of an optical radiation having wavelengths ranging between 0.8-1.6 μm.

As shown in FIG. 3, the optical device 100 silicon dioxide multilayer structure is generally indicated with the reference numeral 101. Such multilayer structure 101 can be divided in a first region 7 including the core 5, and a second region 8 adjacent to the first region. Such second region 8 comprises the upper cladding layer 6 in contact with the lower cladding layer 2, and also includes the protective element 3.

Figure 4:
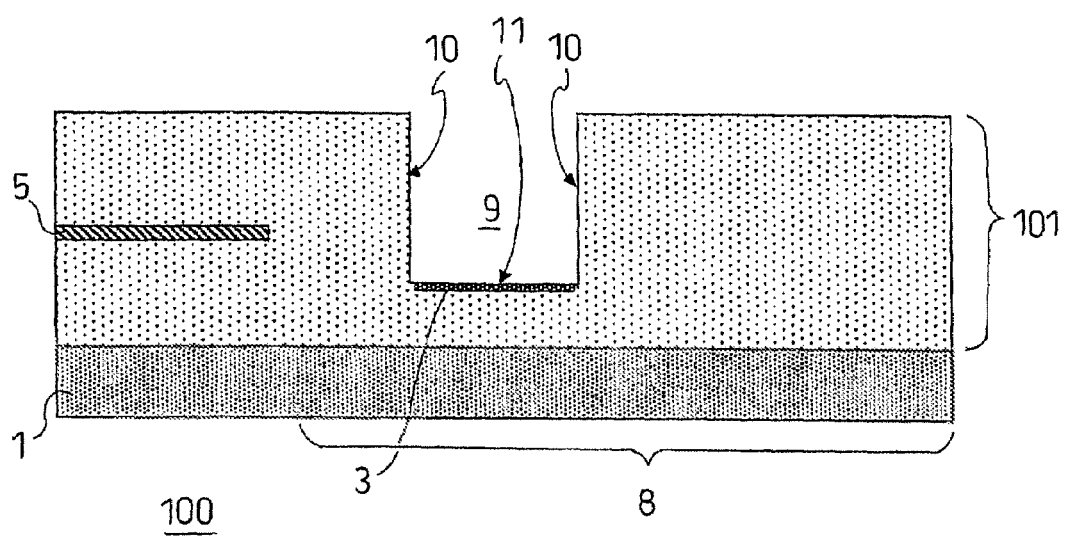
FIG. 4 shows in a sectional view a manufacturing step of a trench of the device of the invention by means of an anisotropic-type etch.
Figure 5:
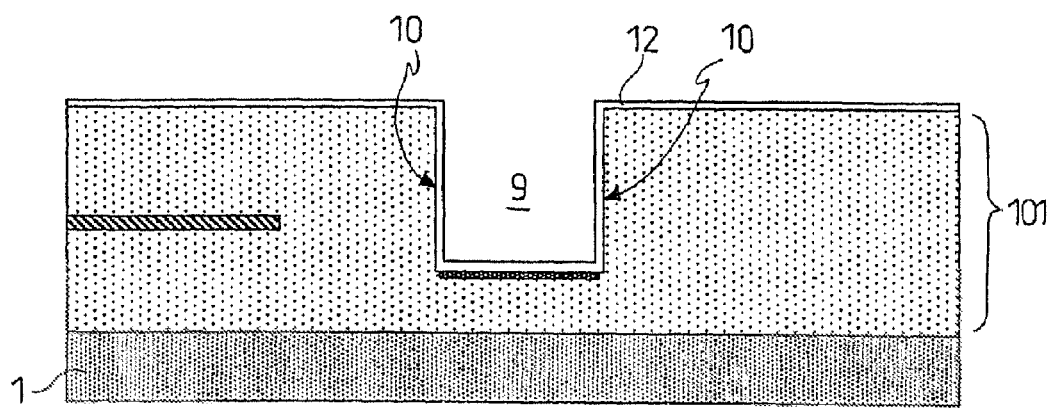
FIG. 5 shows in a sectional view a coating step of the side walls and the bottom wall of the trench of FIG. 4 by means of a protective layer.

With reference to the FIG. 4, the process according to the invention provides for a formation step of a trench 9 in the silicon dioxide multilayer 101.

In particular, a formation step of a first masking structure (not shown in the Figure) which is adapted to leave essentially exposed at least part of the multilayer 101 second region 8 to a successive etching step of the silicon dioxide is provided on the upper cladding layer 6. Such first masking structure is defined, by means of conventional techniques, starting from a photo-sensitive material layer, for example a photoresist. Furthermore, it should be noted that an opening is defined on the photoresist of the first masking structure such as to turn out to be essentially vertically aligned with the lower protective element 3.

The successive step is a plasma dry etch performed via the above-mentioned first masking structure opening in order to create the trench 9. In particular, the dry etch removes the upper cladding 6 and the lower cladding 3 silicon dioxide until reaching the protective element 3. It should be noted that, as is known to those skilled in the art, the above-mentioned dry etch is of an anisotropic type, that is, an etching speed in the direction perpendicular to the surface to be etched is much higher than the etching speed in the lateral direction.

Therefore, as apparent from FIG. 4, the trench 9 has walls 10 which are essentially vertical relative to the substrate 1, and which are mutually jointed by an essentially planar bottom wall 11 obtained in the proximity of the protective element 3. In particular, thanks to the anisotropic-type etch which is employed, the trench 9 vertical walls 10 have an inclination near to 90 degrees with a maximum tolerance of 0.5 degrees relative to the substrate 1.

In any event, different tolerances, for example, ranging between 1-1.5 degrees, are also acceptable in other exemplary embodiments.

On the integrated optical device 100 of FIG. 4 a protective coating layer 12 (FIG. 5) is created, typically by deposition, for example in poly-silicon, having the function of advantageously protecting the vertical walls 10 and the bottom wall 11 of the trench 9 by a successive etching step of the silicon dioxide multilayer 101 which will be described below. Such protective layer 12 represents, as is known to those skilled in the art, a hard mask. The protective layer 12 typical thickness ranges between 0.5 μm-5 μm as a function of the oxide thickness to be etched and the selectivity of the reaction chemistry.

After that, one proceeds to the deposition of a photosensitive polymeric material layer 13, for example, a dry resist, on the device 100.

It should be noted that such dry resist is typically available wrapped onto a roll having a thickness in the range between 15-50 μm, and the deposition thereof on the structure of FIG.

5 takes place by unwrapping the same roll, by means of a lamination technical process, in a quick and easy way.

In particular, the dry resist layer 13 has a stiffness such as to turn out to be applied to the device 100 structure as a layer which is parallel to the substrate 1. In other terms, such dry resist layer 13 does not follow the trench 9 profile.

Subsequently, with reference to the FIG. 6, a masking and etching step of the deposited dry resist layer 13 removes a portion of such layer while obtaining a first opening 14 such as to put in communication the trench 9 with the outside.

Figure 6:
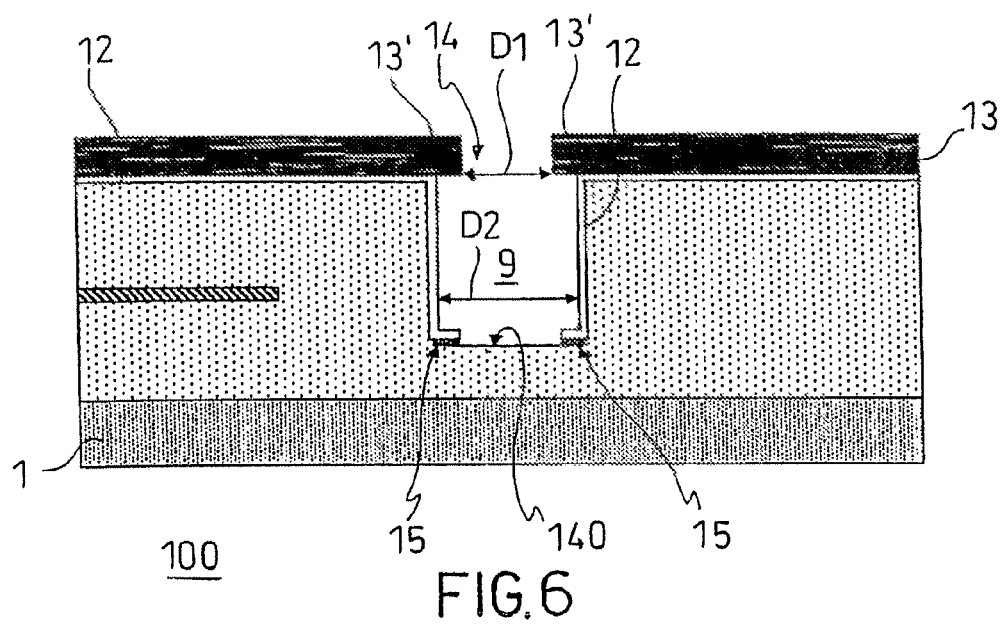
FIG. 6 shows in a sectional view a delimitation step of an opening on the trench bottom.

Again, with reference to the FIG. 6, it should be noted that the opening 14 is defined by opposite ends 13' of the dry resist layer 13 which project above the trench 9. Such ends 13' have a mutual distance D1 lower than a respective distance D2 between the opposite vertical walls 10 of the same trench covered by the hard mask 12.

At this point, one proceeds to a selective removal sequential step of the hard mask protective layer 12 and the lower protective element 3 from the trench 9 bottom by using the dry resist layer 13 as a mask. With reference to the FIG. 6, by means of such step only a central portion of such protective layers 12 and 3 is removed, thus obtaining a respective second opening 140 which leaves the lower silicon dioxide multilayer 101 uncovered. It should be noted that side portions 15 of the above-mentioned protective layers 12 and 3 which are aligned with the dry resist layer 13 projections 13' are not removed during this step.

The process of the invention proceeds with the removal of the dry resist layer 13 and with a further etching step described with reference to the FIGS. 7-9.

In particular, such further step is an isotropic-type etch, for example a wet etch, per se known to those skilled in the art. An isotropic-type wet etch consists, for example, in etches in hydrofluoric acid (HF)-based aqueous solution which are referred to by the acronym BOE (Buffered Oxide Etch) due to the presence of buffering chemical compounds in order to keep the solution pH stable.

As is known, an isotropic-type etch has an etching speed in the direction normal to the surface to be etched which is nearly equal to the etching speed in the lateral direction. Therefore, as indicated by the arrows F in the FIGS. 7-9, the second isotropic-type etch tends to remove the multilayer 101 silicon dioxide in each direction starting from the second opening 140.

Figure 7:
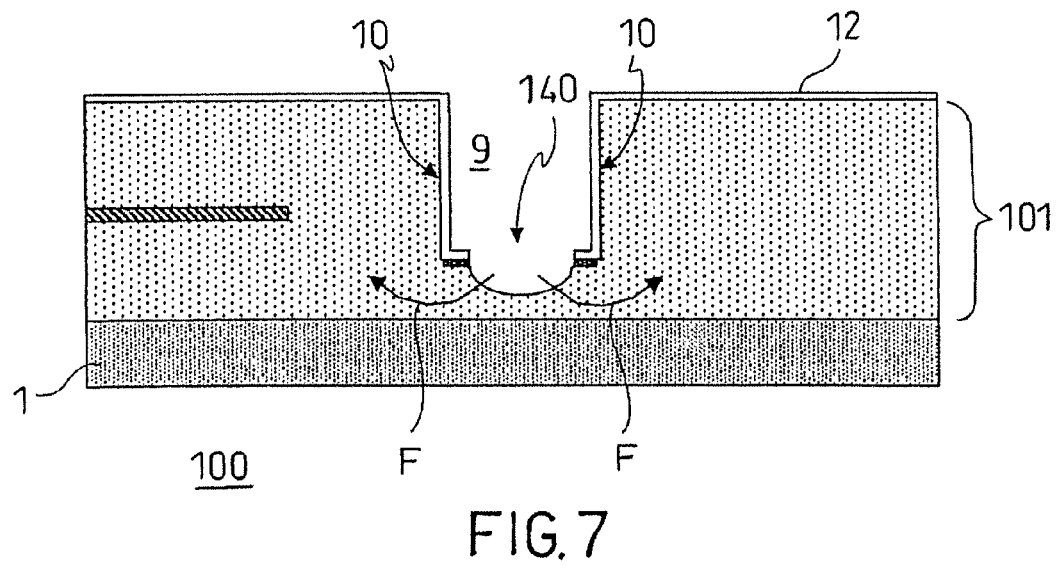
FIGS. 7, 8, and 9 show successive instants of an isotropic etching step of the silicon oxide of the device according to the process of the invention.

In particular, it should be noted that the silicon dioxide removal takes place firstly in the direction essentially vertical to the substrate 1, as shown in FIG. 7. In other terms, first of all the silicon dioxide layer comprised between the second opening 140 and the substrate 1 is removed, while the oxide in the proximity of the trench 9 side walls 10, which is protected by the hard mask 12, is not removed.

Figure 8:
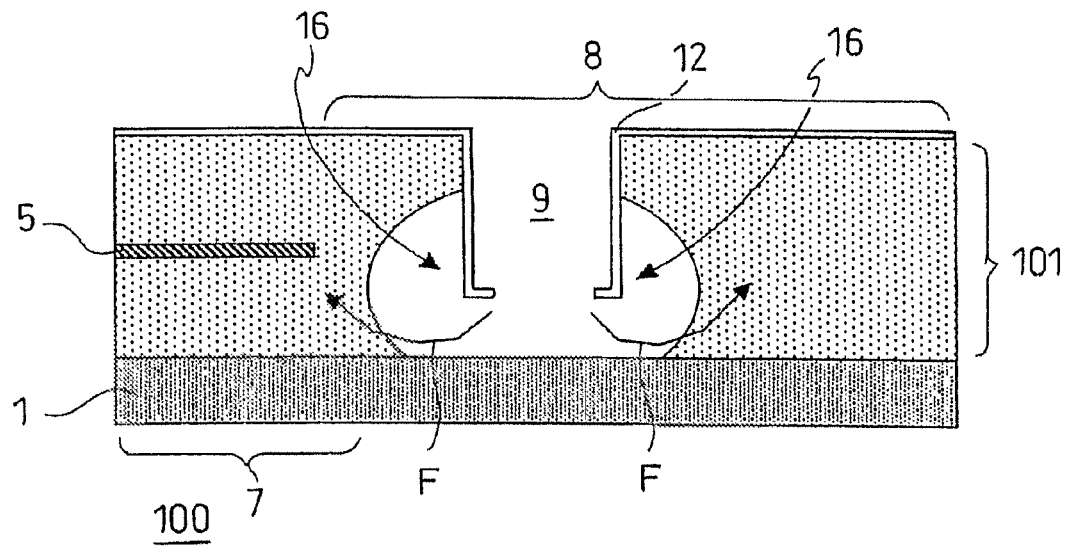
Figure 9:
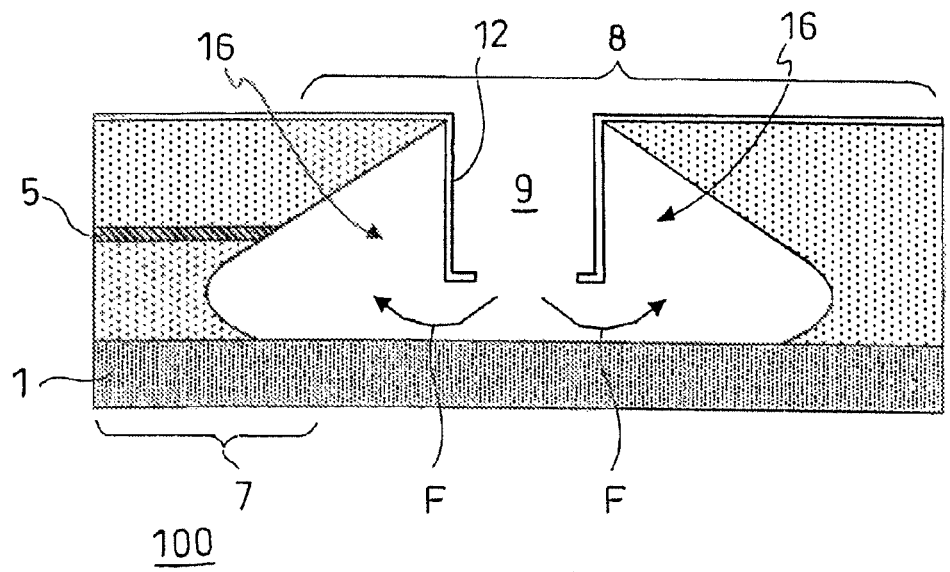

Next, the multilayer 101 dioxide is removed also laterally, in a direction which is essentially parallel to the same substrate 1, as shown in the FIGS. 8 and 9. It should be noted, in particular, that the isotropic etching step of the multilayer 101 oxide proceeds symmetrically to the trench 9 sides, also involving oxide portions of the trench 9 vertical walls 10 which are coated by the protective layer 12.

Ultimately, the above-mentioned wet etch tends to enlarge the trench 9 inside the multilayer 101 until forming a recess 16 such as to extend both in the multilayer second region 8 and in the first region 7 comprising the waveguide core 5. In particular, as shown in FIG. 9, by proceeding with the wet etch step, the lower cladding layer 2 oxide is removed on a higher extent than that of the upper cladding layer 6. Furthermore, the wet etch also removes a guide core 5 portion located in the proximity of the second region 8.

Figure 10:
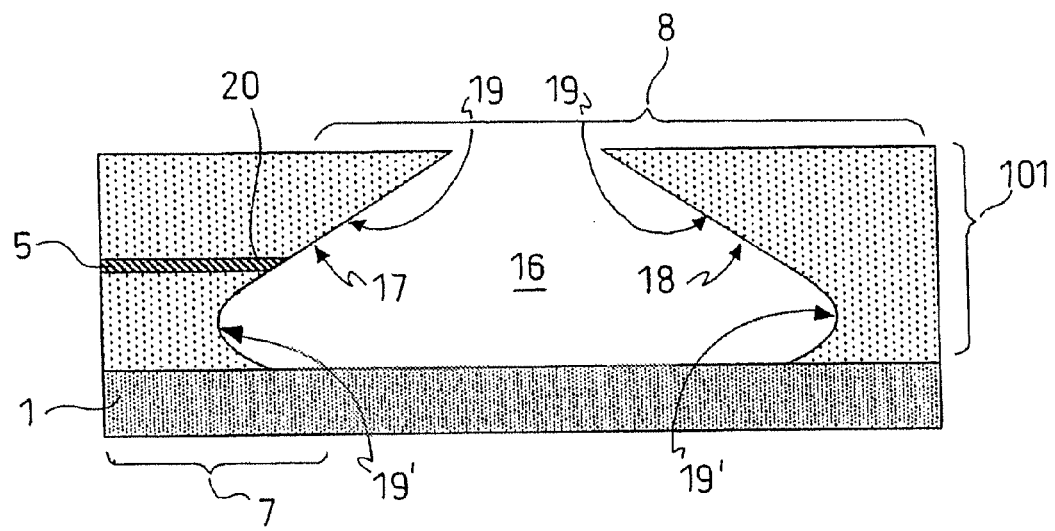
FIG. 10 shows in a sectional view a structure of the waveguide optical device provided with a turning mirror obtained by means of the process according to the invention.

At the end of the wet etch, the duration of which can reach, for example, 90-120 minutes, a successive process step provides for the removal, by means of known techniques, of the hard mask protective layer 12 in order to obtain the waveguide optical device of FIG. 10.

With reference to the FIG. 10, it should be noted that the recess 16 obtained by means of the process of the invention has a first 17 and a second 18 walls which are opposite one to the other. Each of such first 17 and second 18 walls comprises a first portion having a planar surface 19 which is inclined relative to the substrate 1, and a concave surface second portion 19' which is jointed to said first portion 19. Furthermore, the second concave portion 19' is essentially jointed also to the substrate 1.

In particular, it should be noted that the first inclined portion 19 of the first wall 17 extends at least partially in the multilayer 101 first region 7 so as to include a first end 20 of the core 5. Such first end 20 represents an inlet/outlet port for the light radiation propagating in the guide core 5.

Furthermore, it should be noted that, advantageously, the first inclined portion 19 of the waveguide device 100 first wall 17 represents a turning mirror to deviate a light radiation propagating in the guide. In particular, such mirror 19 is arranged inside the waveguide device 100 structure. It should be noted that such mirror 19 comprises a surface of the core 5 inlet/outlet port 20 inside the multilayer structure 101, and it is adapted to reflect the light radiation entering/exiting the core 5.

It should be noted that, in order to ensure a complete reflection of the light radiation, the inclination relative to the substrate 1 of the first portions 19 of the first 17 and the second 18 walls must be, for example, of an angle α such that the relationship $\sin(\alpha) <= 1/n$ is verified, where "n" is the waveguide refractive index. In the process of the invention, α is preferably less than or equal to 43 degrees.

Advantageously, such angle of inclination α is adjustable by varying the phosphorous dopant concentration of the multilayer 101 silicon dioxide. Furthermore, such inclination is also adjustable by controlling the etching solution temperature and composition.

According to the mirror 19 inclination relative to the substrate 1, the light radiation can be suitably deviated towards a receiving optoelectronic device.

Figure 11:
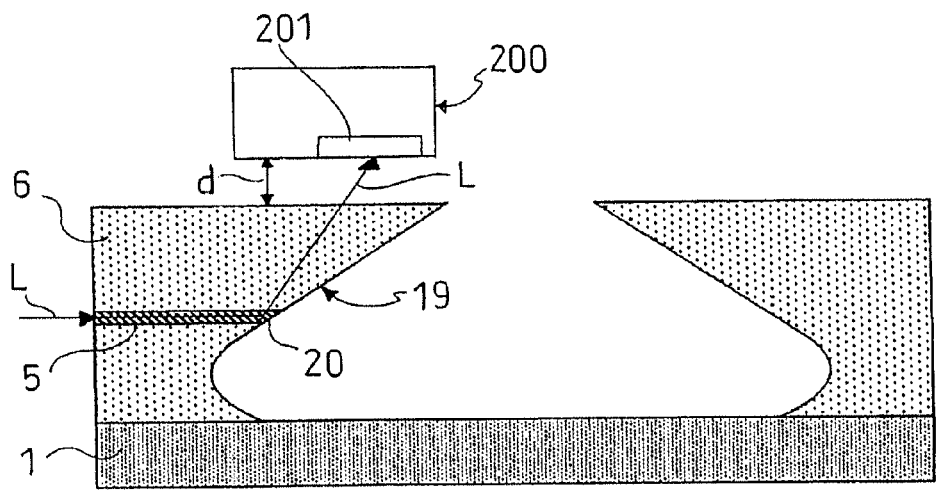
FIG. 11 schematically shows an operational example of the integrated optical device obtained by means of the process according to the invention.

In this regard, an example of a hybrid circuit comprising the waveguide optical device 100 manufactured by the process of the invention and coupled to a further optical device 200 is schematically shown in FIG. 11.

In particular, such further optical device 200 can be a light radiation detecting optoelectronic device.

The above-mentioned optoelectronic device 200 can be, for example, an avalanche photodiode or APD, or a PIN (P-intrinsic-N) diode, that is, a photo-detecting device which is adapted to receive the light radiation and convert it into an electrical signal.

It should be noted that such optoelectronic device 200 can be arranged above the waveguide device 100, thus turning out to be spaced from the upper cladding layer 6 by an interspace d. Such interspace d has, for example, a width of about 5 μm.

In this case, a light radiation L propagating in the waveguide device 100 is partially reflected by the mirror 19, thus being deviated towards the photo-detector 200.

It should be noted, in particular, that the optical path of the light radiation L passes through the upper cladding layer 6 and, in the proximity of the photo-detector 200, passes through the short interspace d in the air. Then, the radiation L reaches an active region 201 of the same photo-detector 200 acting as a light radiation collector.

In other terms, the light radiation L optical path is mostly confined inside the waveguide device 100.

Furthermore, it should be noted that the further optical device 200 can also be a transmitting-type optoelectronic device. For example, such transmitting device 200 can be a VCSEL (Vertical Cavity Surface Emitting Laser), or a surface emitting LED (Light Emitting Diode) adapted to transmit the above-indicated light radiation L.

In particular, the light radiation L emitted by such transmitting optoelectronic device 200 can be sent onto the optical device 100 core 5 of the invention by exploiting the reflection effect of the mirror 19. In such case, it is necessary that the radiation which is emitted is incident on the upper cladding layer 6 by a prefixed angle as a function of the mirror 19 inclination.

Also in this case, the light radiation L optical path will be mostly confined inside the waveguide device 100.

Furthermore, the further optical device 200 can be a passive optical device adapted to couple the electromagnetic radiation L coming from the waveguide device 100 with a further optical guide. For example, such passive optical device is an optical mirror, am integrated micro-optic device of the Bragg grating-type, or a holographic device.

Advantageously, the process of the invention allows manufacturing waveguide devices 100 in which the attenuation and spatial dispersion effects (for example, reduction of the light signal power, widening of the beam) which a light radiation L beam could undergo due to refractive index differentials upon passing from the waveguide into the air are negligible.

Furthermore, the reduction of the undesired spatial dispersion effects improves the coupling between such waveguide device 100 and the optoelectronic photo detecting devices 200. In fact, photodetectors with high sensitivity can be used in many applications, that is, having reduced active regions 201. In particular, such photodetectors 200 have low parasitic capacities, thereby turning out to be quicker in the processing of the optical signals which are received.

Furthermore, it should be noted that the manufacturing of the waveguide device 100 is compatible with the photolithographic technologies which are used in the field, and the operational steps used can be implemented in an easy and not much expensive manner.

In addition, metallization layers to manufacture the optical device 100 turning mirror 19 are not necessary.

Furthermore, it should be noted that, by using the same operational steps described, it is possible to manufacture an integrated optical device 100 comprising a further core arranged in the multilayer 101 second region 8. Such further core can be defined starting from the core layer during the photolithographic process which manufactures the same core 5, that is, by removing a central portion of such layer in order to divide the above-mentioned further core from the core 5. In such a case, the protective element 3 would turn out to be arranged in an intermediate position relative to the two above-mentioned cores.

Ultimately, such further core comprises a respective light radiation inlet/outlet port included in the second wall 18 respective inclined portion 19.

Of course, those of ordinary skill in the art, with the aim of meeting specific, contingent needs, will be able to make further modifications and variations to the process of the present invention, all of which are nonetheless within the protection scope of the invention, as defined by the following claims.

The invention claimed is:

1. A process for manufacturing an integrated optical device comprising:
    forming on a silicon substrate a silicon dioxide multilayer structure containing, in a first region, a waveguide core layer of the optical device, said core being provided with an electromagnetic radiation inlet/outlet port;
    forming, by an anisotropic etch, a trench in a second region of the multilayer structure adjacent said first region, said trench comprising side walls and a bottom wall spaced from said substrate;
    forming a protective coating layer of said side walls and said bottom wall;
    defining an opening in said bottom wall by at least partially removing the protective coating layer in order to expose a lower silicon dioxide portion of the multilayer structure; and
    performing an isotropic etch through said opening in order to remove, starting from the exposed lower silicon dioxide portion, the multilayer structure silicon dioxide until a recess is formed in the multilayer structure having a first wall provided with at least one essentially planar portion inclined relative to the substrate, such inclined portion extending at least partially in said first region and including said inlet/outlet port.

2. The process according to claim 1, wherein said inclined portion of the first wall comprises a core inlet/outlet port surface inside the multilayer that is adapted to reflect the electromagnetic radiation entering/exiting said core.

3. The process according to claim 1, wherein said formation of the multilayer structure comprises formation, at least in part of said second region, of a silicon dioxide protective layer of the multilayer.

4. The process according to claim 3, wherein said protective layer is buried inside the multilayer silicon dioxide and spaced from the substrate in order to protect the lower silicon dioxide portion of the multilayer.

5. The process according to claim 4, wherein said protective layer comprises polycrystalline silicon having a thickness in the range between 0.5-3 µm.

6. The process according to claim 3, wherein said formation of the trench by anisotropic etching comprises the removal of the multilayer structure silicon oxide arranged above the protective layer until matching the trench bottom wall with said protective layer.

7. The process according to claim 1, wherein said formation of the protective coating layer comprises a deposition of a polysilicon hard mask protective layer having a thickness ranging between 0.5 µm -1.5 µm.

8. The process according to claim 1, wherein said removal of said protective coating layer from the trench bottom wall further comprises:
    depositing, above the multilayer, a photosensitive polymeric material layer having a rigidity to be parallel to the substrate;
    masking and etching said polymeric material layer in order to create a first opening passing in said material above the trench in order to put in communication the trench with the outside; and
    sequentially selectively removing the protective coating layer and the lower protective layer from the trench bottom by using the polymeric material layer as a mask.

9. The process according to claim 8, wherein said first opening is defined by opposite ends of the polymeric material layer that project above the trench, so that a first distance between said opposite ends is lower than a second distance between the trench opposite vertical walls that are covered by the protective coating layer.

10. The process according to claim 8, wherein said selective removal of the protective coating layer and of the protective layer creates said opening.

11. The process according to claim 1, wherein said isotropic etch creates a recessed second wall opposite said first wall.

12. The process according to claim 1, wherein said anisotropic etching is a dry etch performed by plasma.

13. The process according to claim 1, wherein said isotropic etch comprises a wet etch performed by employing hydrofluoric acid-based solutions.

14. The process according to claim 11, wherein said planar inclined portions of the first and the second walls of the recess have an inclination ($\alpha$) relative to the substrate given by:

$$\sin(\alpha) \leq 1/n$$

where n is the waveguide refractive index.

15. The process according to claim 14, wherein said inclination ($\alpha$) of the planar inclined portions relative to the substrate is less than or equal to 43 degrees.

16. The process according to claim 11, wherein said first and second walls of the recess comprise concave portions.

17. The process according to claim 1, wherein said formation of the multilayer structure further comprises:
    depositing a first silicon dioxide cladding layer including the protective layer above the substrate;
    depositing the core layer above said first cladding layer, said core layer being silicon dioxide;
    performing a photolithographic process of said core layer in order to obtain the layout of a waveguide core in said multilayer structure first region; and
    covering said core by the second cladding layer, said second cladding layer being silicon dioxide doped with boron and phosphorous.

18. The process according to claim 17, wherein said core layer has a thickness of 3-4 μm, and it can be doped with phosphorous, nitrogen, nitrogen oxide, and alumina.

19. The process according to claim 17, wherein each of said first and second cladding layers has a thickness ranging between 13-17 μm and an equal refractive index.

20. A process for manufacturing an integrated optical device comprising:
    forming on a substrate a silicon dioxide multilayer structure containing, in a first region, a waveguide core layer of the optical device, said core being provided with an electromagnetic radiation inlet/outlet port;
    forming, by a first etch, a trench in a second region of the multilayer structure adjacent said first region, said trench comprising side walls and a bottom wall spaced from said substrate;
    forming a protective coating layer of said side walls and said bottom wall;
    defining an opening in said bottom wall by at least partially removing the protective coating layer in order to expose a lower silicon dioxide portion of the multilayer structure; and
    performing a second etch through said opening in order to remove, starting from the exposed lower silicon dioxide portion, the multilayer structure silicon dioxide until a recess is formed in the multilayer structure having a first wall provided with at least one essentially planar portion inclined relative to the substrate, such inclined portion extending at least partially in said first region and including said inlet/outlet port.

21. A process for manufacturing an integrated optical device comprising:
    forming on a substrate a silicon dioxide multilayer structure containing, in a first region, a waveguide core layer of the optical device, said core being provided with an electromagnetic radiation inlet/outlet port;
    forming a trench in a second region of the multilayer structure adjacent said first region, said trench comprising side walls and a bottom wall spaced from said substrate;
    forming a protective coating layer of said side walls and said bottom wall;
    defining an opening in said bottom wall by at least partially removing the protective coating layer in order to expose a lower silicon dioxide portion of the multilayer structure; and
    removing, starting from the exposed lower silicon dioxide portion, the multilayer structure silicon dioxide until a recess is formed in the multilayer structure having a first wall provided with at least one essentially planar portion inclined relative to the substrate, such inclined portion extending at least partially in said first region and including said inlet/outlet port.

* * * * *

UNITED STATES PATENT AND TRADEMARK OFFICE
CERTIFICATE OF CORRECTION

| | | |
|---|---|---|
| PATENT NO. | : 7,998,356 B2 | Page 1 of 1 |
| APPLICATION NO. | : 12/015338 | |
| DATED | : August 16, 2011 | |
| INVENTOR(S) | : Francesco Martini et al. | |

It is certified that error appears in the above-identified patent and that said Letters Patent is hereby corrected as shown below:

Title Page, Item (57) Abstract

Line 6, after "outlet" add --.--

Line 7, after "by" delete "a"

Signed and Sealed this
Eighth Day of November, 2011

David J. Kappos
*Director of the United States Patent and Trademark Office*